(12) United States Patent
Han et al.

(10) Patent No.: US 12,262,376 B2
(45) Date of Patent: *Mar. 25, 2025

(54) TRANSMISSION PROCESSING METHOD AND APPARATUS, DEVICE, AND STORAGE MEDIUM

(71) Applicant: Tencent Technology (Shenzhen) Company Limited, Shenzhen (CN)

(72) Inventors: Yunbo Han, Shenzhen (CN); Yiyong Zha, Shenzhen (CN); Binhui Ning, Shenzhen (CN); Gang Wu, Shenzhen (CN); Xing Meng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/649,855

(22) Filed: Apr. 29, 2024

(65) Prior Publication Data

US 2024/0284452 A1  Aug. 22, 2024

Related U.S. Application Data

(63) Continuation of application No. 17/238,160, filed on Apr. 22, 2021, now Pat. No. 12,004,150, which is a
(Continued)

(30) Foreign Application Priority Data

Jan. 7, 2019  (CN) .......................... 201910018390.8

(51) Int. Cl.
*H04W 72/1268* (2023.01)
*H04W 72/0446* (2023.01)
(Continued)

(52) U.S. Cl.
CPC ... *H04W 72/1268* (2013.01); *H04W 72/0446* (2013.01); *H04W 72/0453* (2013.01); *H04W 72/1273* (2013.01); *H04W 72/535* (2023.01)

(58) Field of Classification Search
CPC ......... H04W 72/1268; H04W 72/1273; H04W 72/535; H04W 72/0446; H04W 72/0453
See application file for complete search history.

(56) References Cited

U.S. PATENT DOCUMENTS

| 2016/0037557 A1 | 2/2016 | Gu et al. |
| 2017/0215206 A1 | 7/2017 | Cheng et al. |

(Continued)

FOREIGN PATENT DOCUMENTS

| CN | 102812772 A | 12/2012 |
| CN | 102905361 A | 1/2013 |

(Continued)

OTHER PUBLICATIONS

Tencent Technology, ISR/WO, PCT/CN2019/123964, Feb. 26, 2020, 7 pgs.

(Continued)

*Primary Examiner* — Kent Krueger
(74) *Attorney, Agent, or Firm* — Morgan, Lewis & Bockius LLP

(57) ABSTRACT

Embodiments of this application disclose a transmission processing method and apparatus, a device, and a storage medium. The method is applied to a first device, and includes: receiving a pre-scheduling message that is transmitted by a second device through a first channel; reading, from the pre-scheduling message, a pre-scheduling moment and a pre-scheduling band that are used for pre-scheduling transmission between the first device and the second device; and transmitting, before the pre-scheduling moment is reached, indication information to the second device by
(Continued)

using any band other than the pre-scheduling band, the indication information being used for indicating cancellation of the pre-scheduling transmission.

20 Claims, 11 Drawing Sheets

Related U.S. Application Data continuation of application No. PCT/CN2019/123964, filed on Dec. 9, 2019.

(51) Int. Cl.
*H04W 72/0453* (2023.01)
*H04W 72/1273* (2023.01)
*H04W 72/50* (2023.01)

(56) References Cited

U.S. PATENT DOCUMENTS

| | | |
|---|---|---|
| 2017/0311337 A1 | 10/2017 | Mo et al. |
| 2018/0027493 A1 | 1/2018 | Li et al. |
| 2018/0077720 A1 | 3/2018 | Wang et al. |
| 2018/0098223 A1 | 4/2018 | Hugl et al. |
| 2021/0258988 A1 | 8/2021 | Balakrishnan et al. |

FOREIGN PATENT DOCUMENTS

| | | |
|---|---|---|
| CN | 105230104 A | 1/2016 |
| CN | 105992373 A | 10/2016 |
| CN | 107046732 A | 8/2017 |
| CN | 109714829 A | 5/2019 |
| EP | 3046365 B1 | 2/2018 |
| JP | 2004248263 A | 9/2004 |
| JP | 2013523018 A | 6/2013 |
| WO | WO 2016182042 A1 | 11/2016 |

OTHER PUBLICATIONS

Tencent Technology, IPRP, PCT/CN2019/123964, Jun. 16, 2021, 6 pgs.

Tencent Technology, Extended European Search Report, EP Patent Application No. 19909037.4, Feb. 4, 2022, 11 pgs.

Tencent Technology, European Office Action, EP Patent Application No. 19909037.4, Dec. 5, 2023, 4 pgs.

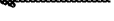
FIG. 6A
FIG. 6B
FIG. 6C
FIG. 7

TRANSMISSION PROCESSING METHOD AND APPARATUS, DEVICE, AND STORAGE MEDIUM

CROSS-REFERENCE TO RELATED APPLICATIONS

This application is a continuation application of U.S. patent application Ser. No. 17/238,160, entitled "TRANSMISSION PROCESSING METHOD AND APPARATUS, DEVICE, AND STORAGE MEDIUM" filed on Apr. 22, 2021, which is a continuation application of PCT Patent Application No. PCT/CN2019/123964, entitled "TRANSMISSION PROCESSING METHOD AND APPARATUS, DEVICE, AND STORAGE MEDIUM" filed on Dec. 9, 2019, which claims priority to Chinese Patent Application No. 201910018390.8, entitled "TRANSMISSION PROCESSING METHOD AND APPARATUS, DEVICE, AND STORAGE MEDIUM" and filed with the China National Intellectual Property Administration on Jan. 7, 2019, all of which are incorporated herein by reference in their entirety.

FIELD OF THE TECHNOLOGY

This application relates to the field of communication technologies, and in particular, to a transmission processing method and apparatus, a device, and a storage medium.

BACKGROUND OF THE DISCLOSURE

Data transmission refers to the process of transferring data between two devices by using one or more channels according to regulations of the communication protocol. That is, the data transmission may indicate the operation of transferring data from one device to another device through signals in a channel.

With the development of communication technologies, gradually, data transmission tends to be performed in a pre-scheduling manner to reduce redundancy such as broadcast signals. The pre-scheduling manner is a manner in which a network device (for example, an access point (AP)) pre-schedules a band for a terminal device (for example, a station (STA)), so that the terminal device performs data transmission by using the band at a pre-scheduling moment. For example, the AP may transmit signaling at 2.4 GHz/5 GHz to schedule the STA to perform data transmission by using a band at 6 GHz at a pre-scheduling moment, and the STA transmits/receives data according to the signaling by using the band at 6 GHz at the pre-scheduling moment.

When the pre-scheduling moment is reached, the data transmission performed by using the pre-scheduling band may be interfered with by signals from other devices using the same band, consequently resulting in a failure of pre-scheduling transmission. Therefore, how to better perform data transmission becomes the research focus.

SUMMARY

Embodiments of this application provide a transmission processing method and apparatus, a device, and a storage medium, to better perform data transmission and improve the data transmission success rate.

According to one aspect, an embodiment of this application provides a transmission processing method. The transmission processing method is applicable to a first device and includes:

receiving a pre-scheduling message that is transmitted by a second device through a first channel;

reading, from the pre-scheduling message, a pre-scheduling moment and a pre-scheduling band that are used for pre-scheduling transmission between the first device and the second device; and transmitting, before the pre-scheduling moment is reached, indication information to the second device by using any band other than the pre-scheduling band, the indication information being used for indicating cancellation of the pre-scheduling transmission.

According to another aspect, an embodiment of this application provides a transmission processing method. The transmission processing method is applicable to a first device and includes:

receiving a pre-scheduling message that is transmitted by a second device through a first channel, the pre-scheduling message carrying a pre-scheduling moment and a pre-scheduling band that are used for pre-scheduling transmission between the first device and the second device; and receiving, before the pre-scheduling moment is reached, downlink target data and indication information that are transmitted by the second device by using any band other than the pre-scheduling band, the indication information being used for indicating cancellation of the pre-scheduling transmission.

According to yet another aspect, an embodiment of this application provides a transmission processing apparatus, applicable to a first device. The transmission processing apparatus includes:

a receiving unit, configured to receive a pre-scheduling message that is transmitted by a second device through a first channel, and read, from the pre-scheduling message, a pre-scheduling moment and a pre-scheduling band that are used for pre-scheduling transmission between the first device and the second device; and a transmission unit, configured to transmit, before the pre-scheduling moment is reached, indication information to the second device by using any band other than the pre-scheduling band, the indication information being used for indicating cancellation of the pre-scheduling transmission.

According to yet another aspect, an embodiment of this application provides a transmission processing apparatus, applicable to a first device. The transmission processing apparatus includes:

a receiving unit, configured to receive a pre-scheduling message that is transmitted by a second device through a first channel, the pre-scheduling message carrying a pre-scheduling moment and a pre-scheduling band that are used for pre-scheduling transmission between the first device and the second device, the receiving unit being configured to receive, before the pre-scheduling moment is reached, indication information that are transmitted by the second device by using any band other than the pre-scheduling band, the indication information being used for indicating cancellation of the pre-scheduling transmission.

According to yet another aspect, an embodiment of this application provides a device, including a communication interface, the device further including:

a processor, suitable to implement one or more instructions; and a computer storage medium, storing one or more instructions, the one or more instructions being suitable to be loaded by the processor to perform the steps in the foregoing method.

According to yet another aspect, an embodiment of this application provides a non-transitory computer storage medium, storing one or more instructions, the one or more instructions being suitable to be loaded by a processor to perform the steps in the foregoing method.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

FIG. 6A is a schematic structural diagram of a control frame according to an embodiment of this application.

FIG. 6B is a schematic diagram of a position of indication information in a control frame according to an embodiment of this application.

FIG. 6C is a schematic diagram of a position of another type of indication information in a control frame according to an embodiment of this application.

FIG. 7 is a schematic structural diagram of a management frame according to an embodiment of this application.

DESCRIPTION OF EMBODIMENTS

The following clearly and completely describes the technical solutions in the embodiments of this application with reference to the accompanying drawings in the embodiments of this application.

Figure 1:
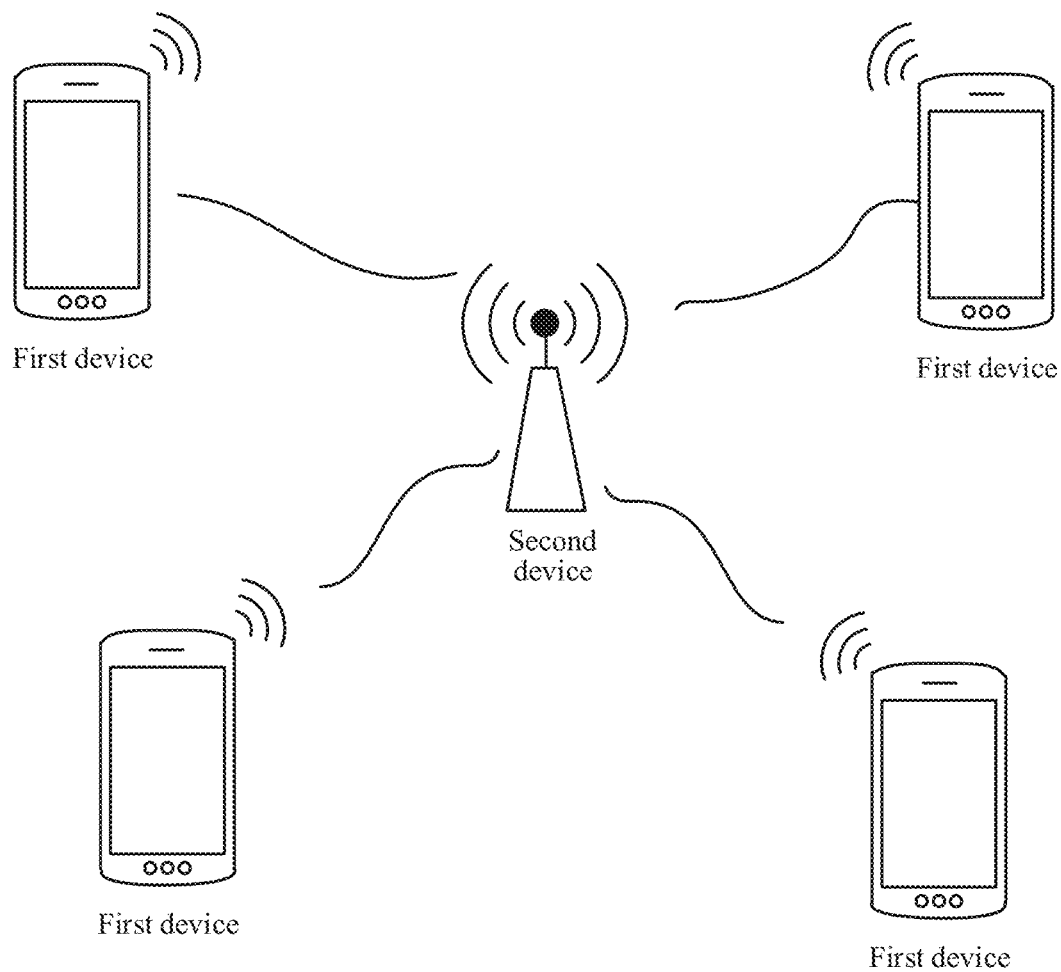
FIG. 1 is a schematic architectural diagram of a network system according to an embodiment of this application.

The embodiments of this application provide a transmission processing method. The transmission processing method is applicable to a network system. The network system herein may include but is not limited to a wireless local area network (WLAN) system, a cellular network system, a Bluetooth system, and the like. As shown in FIG. 1, the network system may include a first device and a second device. The first device may refer to any terminal device in the network system. The terminal device herein may include but is not limited to a station (STA), a user equipment (UE), and the like. The second device may refer to any network device in the network system. The network device herein may include but is not limited to an access point (AP), a base station, and the like. Data transmission may be performed between the first device and the second device. Besides, the second device can schedule the data transmission between the first device and the second device. For convenience of description, the embodiments of this application are each described below by using an example that the transmission processing method is implemented in a WLAN system. Reference may be made to the embodiments of this application for the principle of implementing the transmission processing method in another network system such as a cellular network system.

Figure 2:
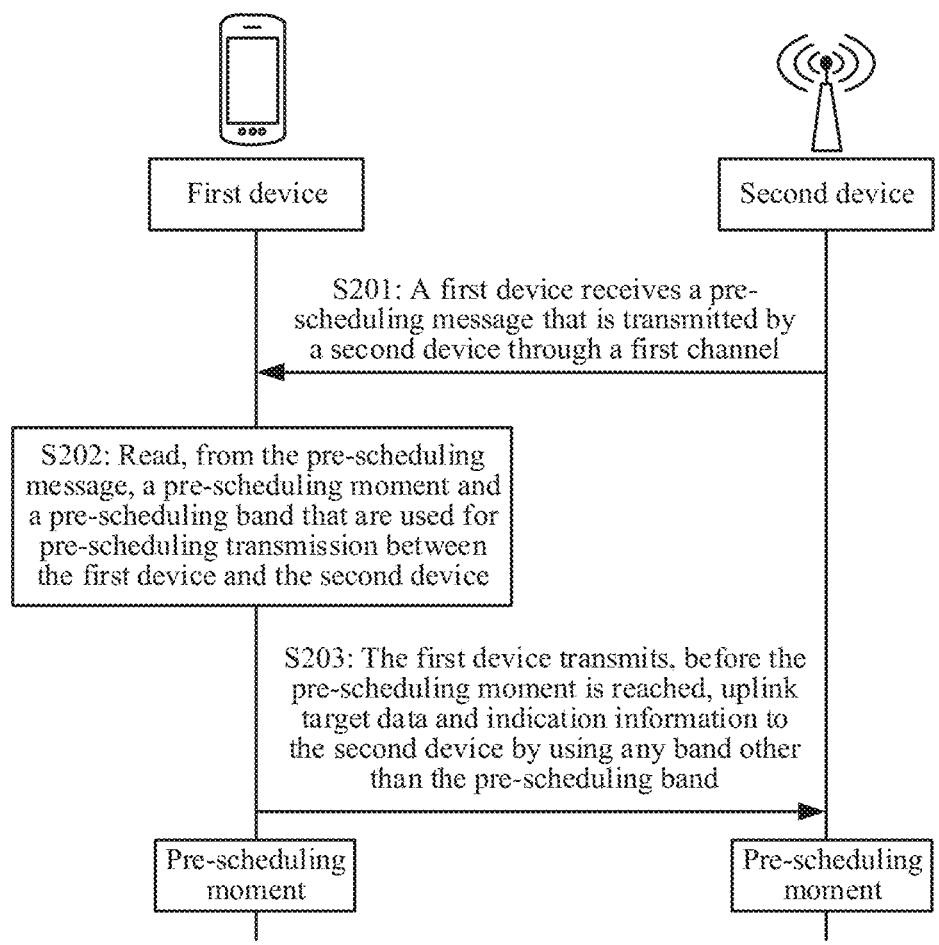
FIG. 2 is a schematic flowchart of a transmission processing method according to an embodiment of this application.

Reference may be made to FIG. 2 for the transmission processing method provided in the embodiments of this application. The transmission processing method is applicable to a WLAN system. The first device may be a STA, and the second device may be an AP. Referring to FIG. 2, the transmission processing method is applied to the first device with consideration of uplink pre-scheduling transmission, and may include the following steps S201 to S203:

S201: The first device receives a pre-scheduling message that is transmitted by the second device through a first channel.

The second device transmits the pre-scheduling message to the first device through the first channel. The first device receives the pre-scheduling message that is transmitted by the second device through the first channel. The pre-scheduling message carries at least parameter information. The parameter information is used for indicating parameters required for pre-scheduling transmission between the first device and the second device.

In this embodiment of this application, to shorten a delay of performing uplink scheduling on the first device, the second device (for example, an AP or a base station) does not require the first device to transmit a scheduling request to the second device. Instead, the second device performs uplink pre-scheduling on the first device. Specifically, the pre-scheduling transmission refers to pre-scheduling a pre-scheduling band for the first device before the second device completes the uplink scheduling, so that the first device transmits uplink target data at a pre-scheduling moment by using the pre-scheduling band.

The parameter information may include time domain information and frequency domain information. The time domain information is used for indicating a pre-scheduling moment. The pre-scheduling moment refers to a moment of pre-scheduling transmission that is performed between the first device and the second device. The frequency domain information is used for indicating a pre-scheduling band.

The pre-scheduling band refers to a band used in pre-scheduling transmission between the first device and the second device.

Therefore, it can be seen that, the pre-scheduling message is used for informing about the following scheduling content that the first device transmits the uplink target data to the second device at the pre-scheduling moment by using the pre-scheduling band. It can be understood that the pre-scheduling message may further carry other information such as a transmission period and a modulation and coding scheme (MCS).

The time domain information carried in the pre-scheduling message may include at least the following two feasible implementations:

In an implementation, the time domain information includes an absolute time parameter. The absolute time parameter refers to absolute and true mathematical time in Newtonian absolute time and space. The absolute time parameter does not rely on any external object. In this implementation, the pre-scheduling moment includes: a moment indicated by the absolute time parameter, or a moment determined according to a current moment and the absolute time parameter. The current moment is a moment indicated by a current system time of the first device.

Systematically, if parameter information of the absolute time parameter is complete, the pre-scheduling moment is the moment indicated by the absolute time parameter. That the parameter information is complete means that the parameter information can explicitly indicate a specific moment. For example, the absolute time parameter is set to 8:20:15: 100:200. The absolute time parameter in this case can explicitly indicate a specific moment, that is, the parameter information of the absolute time parameter in this case is complete. Correspondingly, the pre-scheduling moment is the moment indicated by the absolute time parameter: 8:20: 15:100:200.

If the parameter information of the absolute time parameter is incomplete, the pre-scheduling moment is determined according to the current moment and the absolute time parameter. For example, the absolute time parameter is set to 100 ms 200 μs. Due to lack of parameter information such as information about the hour, minute, and second, the absolute time parameter in this case cannot explicitly indicate a specific moment, that is, the parameter information of the absolute time parameter in this case is incomplete. Correspondingly, the pre-scheduling moment is determined according to the current moment and the absolute time parameter. The current moment is set to 8:22:30:20:50. Reference may be made to parameter information corresponding to the current moment for the parameter information lacked in the absolute time parameter. The lacked parameter information may be 8:22:30. Then the pre-scheduling moment may be 8:22:30:20:50.

In the other implementation, the time domain information includes a reference time offset parameter. In this implementation, the pre-scheduling moment includes: a moment determined according to a reference moment and the reference time offset parameter. The reference moment includes: a moment when the first device receives the pre-scheduling message, or a moment when the second device transmits the pre-scheduling message. For example, the reference moment is a moment when the first device receives the pre-scheduling message: 8:22:30:20:50, the reference time offset parameter is 300 ms after the reference moment, and then the pre-scheduling moment is 8:22:30:320:50. In another example, the reference moment is a moment when the second device transmits the pre-scheduling message: 8:22:20:220:50, the reference time offset parameter is 30 s after the reference moment, and then the pre-scheduling moment is 8:22:50:220:50.

S202: The first device reads, from the pre-scheduling message, a pre-scheduling moment and a pre-scheduling band that are used for pre-scheduling transmission between the first device and the second device.

When the first device transmits data to the second device by using the pre-scheduling band at the pre-scheduling moment which is reached, there may be signal interference from other devices using the same band, resulting in a failure of data transmission. That is, the first device cannot successfully transmit the uplink target data to the second device at the pre-scheduling moment.

Many services such as a multiplayer online battle arena (MOBA) service have relatively high delay requirements. If at the pre-scheduling moment, the first device does not successfully transmit the uplink target data to the second device, the service may be affected adversely, such as causing a frozen or a delayed interface.

Therefore, to avoid the impacts on the service caused by unsuccessful transmission of the uplink target data of the pre-scheduling transmission at the pre-scheduling moment, step S203 is performed.

S203: The first device transmits, before the pre-scheduling moment is reached, the uplink target data and indication information to the second device by using any band other than the pre-scheduling band, the indication information being used for indicating cancellation of the pre-scheduling transmission.

Specifically, step S203 may include the following two implementations:

In an implementation, before the pre-scheduling moment is reached, the first device transmits the uplink target data and the indication information simultaneously to the second device. In this implementation, step S203 may include the following step: the first device transmits a first data message to the second device through a second channel before the pre-scheduling moment is reached, the first data message carrying the uplink target data and the indication information, and a band other than the pre-scheduling band being used in the second channel.

A band used in the first channel may be the same as, different from, or partially the same as the band used in the second channel, which is not limited. For example, the band used in the first channel is 20 MHz in channel 1 in 2.4 GHz band. The band used in the second channel is also 20 MHz in channel 1 in 2.4 GHz band. In this case, the band used in the first channel is the same as the band used in the second channel. In another example, the band used in the first channel is 20 MHz in channel 1 in 2.4 GHz band. The band used in the second channel is 80 MHz in 6 GHz band. In this case, the band used in the first channel is different from the band used in the second channel. In still another example, the band used in the first channel is 20 MHz in 6 GHz band. The band used in the second channel is 40 MHz in 6 GHz band including the foregoing 20 MHz. In this case, the band used in the first channel is partially the same as the band used in the second channel.

In the other implementation, before the pre-scheduling moment is reached, the first device may transmit the uplink target data and the indication information individually to the second device. In this implementation, step S202 may include the following steps: the first device transmits a second data message to the second device through a third channel before the pre-scheduling moment is reached, the second data message carrying the uplink target data, and a band other than the pre-scheduling band being used in the third channel; and the first device transmits a third data message to the second device through a second channel if the second data message is transmitted successfully, the third data message carrying the indication information, and a band other than the pre-scheduling band being used in the second channel. The band used in the second channel is the same as, different from, or partially the same as the band used in the third channel.

The indication information may be represented by a preset number of bits.

In an implementation, one or more bits may be used for representation. For example, one bit "0" is used for representing cancellation of the pre-scheduling transmission. In another example, a plurality of bits "000" are used for representing cancellation of the pre-scheduling transmission.

In another implementation, the indication information includes a target serial number or a target pre-scheduling moment. The indication information is used for indicating that the second device cancels pre-scheduling transmission corresponding to the target serial number, or indicating that the second device cancels pre-scheduling transmission corresponding to the target pre-scheduling moment. For example, if there is one time of pre-scheduling transmission between the first device and the second device, the target serial number of the pre-scheduling transmission is 1, and "00" may be used to represent the target serial number. If the indication information includes the target serial number, the indication information is used for indicating cancellation of pre-scheduling transmission whose target serial number is "1". In another example, the target pre-scheduling moment of the pre-scheduling transmission is "8:20:15:100:200", several bits may be used to represent the target pre-scheduling moment. If the indication information includes the target pre-scheduling moment, the indication information is used for indicating cancellation of pre-scheduling transmission whose target pre-scheduling moment is "8:20:15:100:200".

In an actual application, the second device may perform a plurality of times of pre-scheduling for the first device, that is, there may be a plurality of pre-scheduling transmissions between the first device and the second device. In this case, the indication information is used for indicating that the second device cancels target pre-scheduling transmission in the plurality of pre-scheduling transmissions.

The target pre-scheduling transmission is the pre-scheduling transmission corresponding to the target serial number; or the target pre-scheduling transmission is the pre-scheduling transmission corresponding to the target pre-scheduling moment; or the target pre-scheduling transmission is pre-scheduling transmission in the plurality of pre-scheduling transmissions other than the pre-scheduling transmission corresponding to the target serial number; or the target pre-scheduling transmission is pre-scheduling transmission in the plurality of pre-scheduling transmissions other than the pre-scheduling transmission corresponding to the target pre-scheduling moment.

The serial number of each pre-scheduling transmission among the plurality of pre-scheduling transmissions is determined according to a difference between a pre-scheduling moment of the each pre-scheduling transmission and a current moment. For example, there are 4 times of pre-scheduling transmission between the first device and the second device, which are sequentially pre-scheduling transmission a, pre-scheduling transmission b, pre-scheduling transmission c, and pre-scheduling transmission d. Differences between pre-scheduling moments of the 4 times of pre-scheduling transmission and a current moment are sequentially 300 ms, 200 ms, 400 ms, and 100 ms. Then pre-scheduling transmission which is nearest (or closest) to the current moment is pre-scheduling transmission d, that is, the serial number of the pre-scheduling transmission d is 1. Pre-scheduling transmission which is second nearest to the current moment is pre-scheduling transmission b, that is, the serial number of the pre-scheduling transmission b is 2. Similarly, the serial number of the pre-scheduling transmission a is 3, and the serial number of the pre-scheduling transmission c is 4.

Figure 3A:
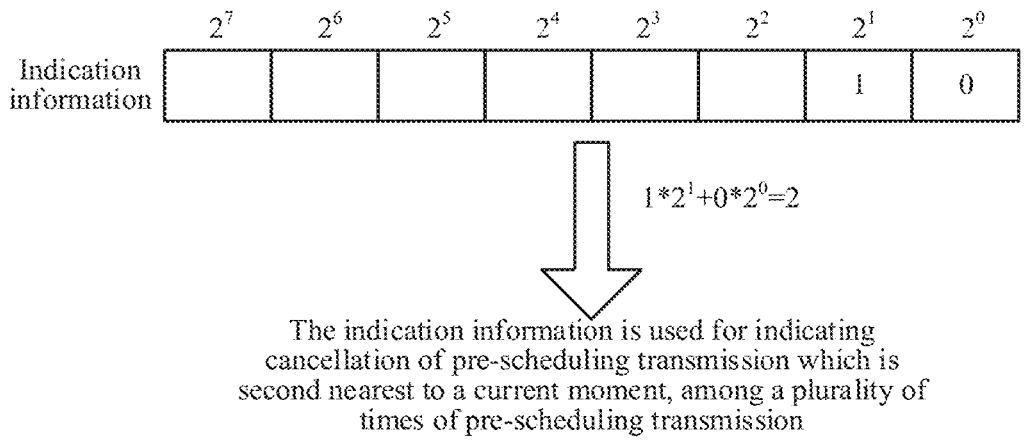
FIG. 3A is a schematic diagram of expression of indication information according to an embodiment of this application.
Figure 3B:
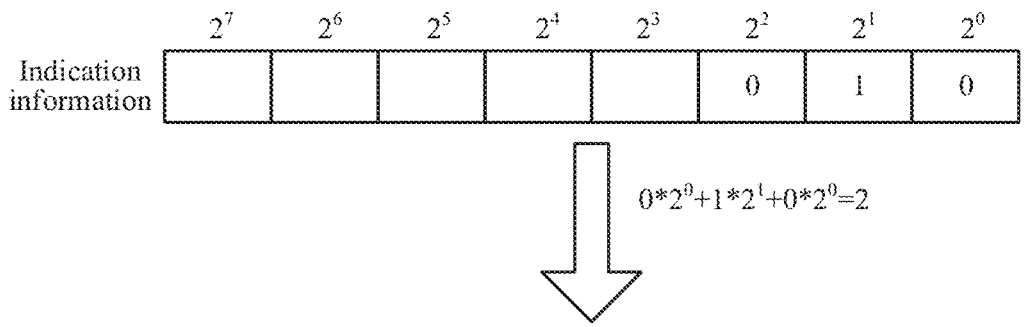
FIG. 3B is a schematic diagram of expression of another type of indication information according to an embodiment of this application.

As shown in FIG. 3A, "10" may be used for indicating cancellation of pre-scheduling transmission which is second nearest to the current moment, that is, the target serial number is 2, in the 4 times of pre-scheduling transmission. The target pre-scheduling transmission is pre-scheduling transmission (pre-scheduling transmission b) corresponding to the target serial number. Alternatively, as shown in FIG. 3B, "010" may be used for indicating preservation of pre-scheduling transmission which is second nearest to the current moment, that is, the target serial number is 2, in the 4 times of pre-scheduling transmission, to cancel other pre-scheduling transmission than the preserved pre-scheduling transmission in the 4 times of pre-scheduling transmission. The target pre-scheduling transmission is pre-scheduling transmission (pre-scheduling transmission a, pre-scheduling transmission c, and pre-scheduling transmission d) other than the pre-scheduling transmission corresponding to the target serial number in the 4 times of pre-scheduling transmission.

In this embodiment of this application, when data transmission is performed between the first device and the second device, the first device may receive parameter information of the pre-scheduling transmission transmitted by the second device. The parameter information includes time domain information used for determining the pre-scheduling moment. By transmitting the uplink target data and the indication information before the pre-scheduling moment is reached, transmission failure of the uplink target data caused by signal interference from other devices when the uplink target data is transmitted at the pre-scheduling moment may be avoided to some extent, thereby improving the data transmission success rate, and reducing the transmission delay. Besides, because the uplink target data and the indication information have been already transmitted before the pre-scheduling moment is reached, and the indication information may indicate cancellation of pre-scheduling transmission, waste of resources of the pre-scheduling transmission can be avoided.

Figure 4:
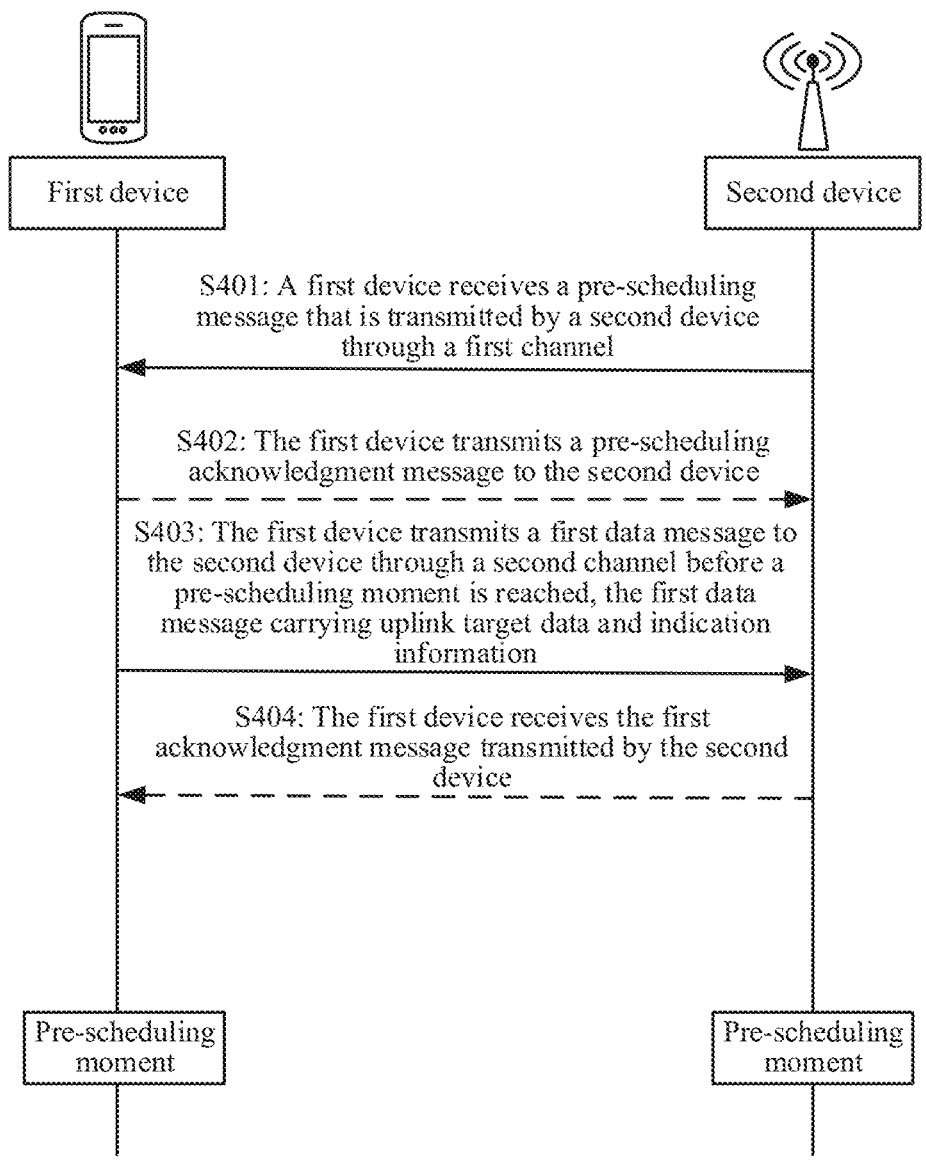
FIG. 4 is a schematic flowchart of a transmission processing method according to another embodiment of this application.

Based on the foregoing description, the embodiments of this application provide another transmission processing method. Referring to FIG. 4, the method is applied to the first device with consideration of uplink pre-scheduling transmission, and may include the following steps S401 to S404:

S401: The first device receives a pre-scheduling message that is transmitted by the second device through a first channel.

The pre-scheduling message carries parameter information. The parameter information includes: time domain information and frequency domain information. The time domain information is used for indicating a pre-scheduling moment. The frequency domain information is used for indicating a pre-scheduling band. The pre-scheduling band may be the same as a band used in the first channel. For example, the band used in the first channel is 20 MHz band in channel 1 in 2.4 GHz band. The pre-scheduling band is also 20 MHz band in channel 1 in 2.4 GHz band. In some embodiments, the pre-scheduling band may be different from a band used in the first channel. For example, the band used in the first channel is 20 MHz band in channel 1 in 2.4 GHz band, and the pre-scheduling band is 20/40/80/160/320 MHz band or a band less than 20 MHz in 6 GHz, which is not limited herein.

In some embodiments, the first device may further perform step S402 after step S401: the first device transmits a pre-scheduling acknowledgment message to the second device.

After receiving the pre-scheduling message, the first device transmits the pre-scheduling acknowledgment message (such as an acknowledgment (ACK) or a response frame) to the second device. The pre-scheduling acknowledgment message is used for confirming to the second device that the first device has already successfully received the pre-scheduling message. If the second device has received the pre-scheduling acknowledgment message transmitted by the first device, it may be considered that the pre-scheduling message is successfully transmitted. If the second device has not received, in preset duration after the pre-scheduling message is transmitted, the pre-scheduling acknowledgment message transmitted by the first device, the second device considers that the pre-scheduling message transmitted by the second device does not successfully arrive at the first device. In this case, the second device may transmit the pre-scheduling message to the first device again, until the pre-scheduling acknowledgment message returned by the first device is received. The preset duration may be set according to empirical values, for example, the preset duration may be set to 60 ms or 400 ms.

In another network system, the second device considers that there may be another implementation for the process in which the pre-scheduling message transmitted by the second device successfully arrives at the first device. For example, in a 5G network system, after the second device transmits the pre-scheduling message to the first device, a timer may be activated. If no feedback from the first device is received in timekeeping duration of the timer (for example, 100 ms or 200 ms), it is automatically confirmed that the pre-scheduling message successfully arrives at the first device, and the pre-scheduling message is transmitted successfully. In another example, in a 4G network system, the pre-scheduling acknowledgment message returned by the first device is not an ACK message, but a data frame message, a control frame message, a management frame message, or the like, each of which carries the ACK, and the second device considers that the pre-scheduling message is transmitted successfully when receiving the foregoing message returned by the first device, and so on.

S403: The first device transmits a first data message to the second device through a second channel before the pre-scheduling moment is reached, the first data message carrying uplink target data and indication information.

A band other than the pre-scheduling band is used in the second channel. The band used in the first channel is the same as, different from, or partially the same as the band used in the second channel. The first data message includes a data frame. The indication information is located in a Media Access Control (MAC) header or a physical header of the data frame.

In some embodiments, the first device may further perform step S404 after step S403: the first device receives a first acknowledgment message transmitted by the second device.

After receiving the first data message that is transmitted by the first device through the second channel, the second device cancels the pre-scheduling transmission according to the indication information in the first data message, and transmits the first acknowledgment message to the first device.

Correspondingly, after transmitting the first data message to the second device, if the first device receives the first acknowledgment message transmitted by the second device, the first device may consider that the first data message transmitted by the first device has successfully arrived at the second device and the second device has confirmed the cancellation of the pre-scheduling transmission. In this case, the first device cancels the pre-scheduling transmission to end the procedure.

If the first device has not received the first acknowledgment message returned by the second device, the first device considers that the first data message does not successfully arrive at the second device. The first device may transmit, according to the parameter information, the uplink target data by using the pre-scheduling band when the pre-scheduling moment is reached and end the procedure.

In this embodiment of this application, when the first device transmits data to the second device, the pre-scheduling moment may be determined according to the time domain information. By transmitting the uplink target data and the indication information before the pre-scheduling moment is reached, signal interference from other devices in data transmission performed at the pre-scheduling moment may be avoided to some extent, thereby improving the data transmission success rate, and reducing the transmission delay. Besides, because the uplink target data is transmitted before the pre-scheduling moment, using the indication information to indicate cancellation of pre-scheduling transmission can avoid waste of resources of the pre-scheduling transmission.

Figure 5:
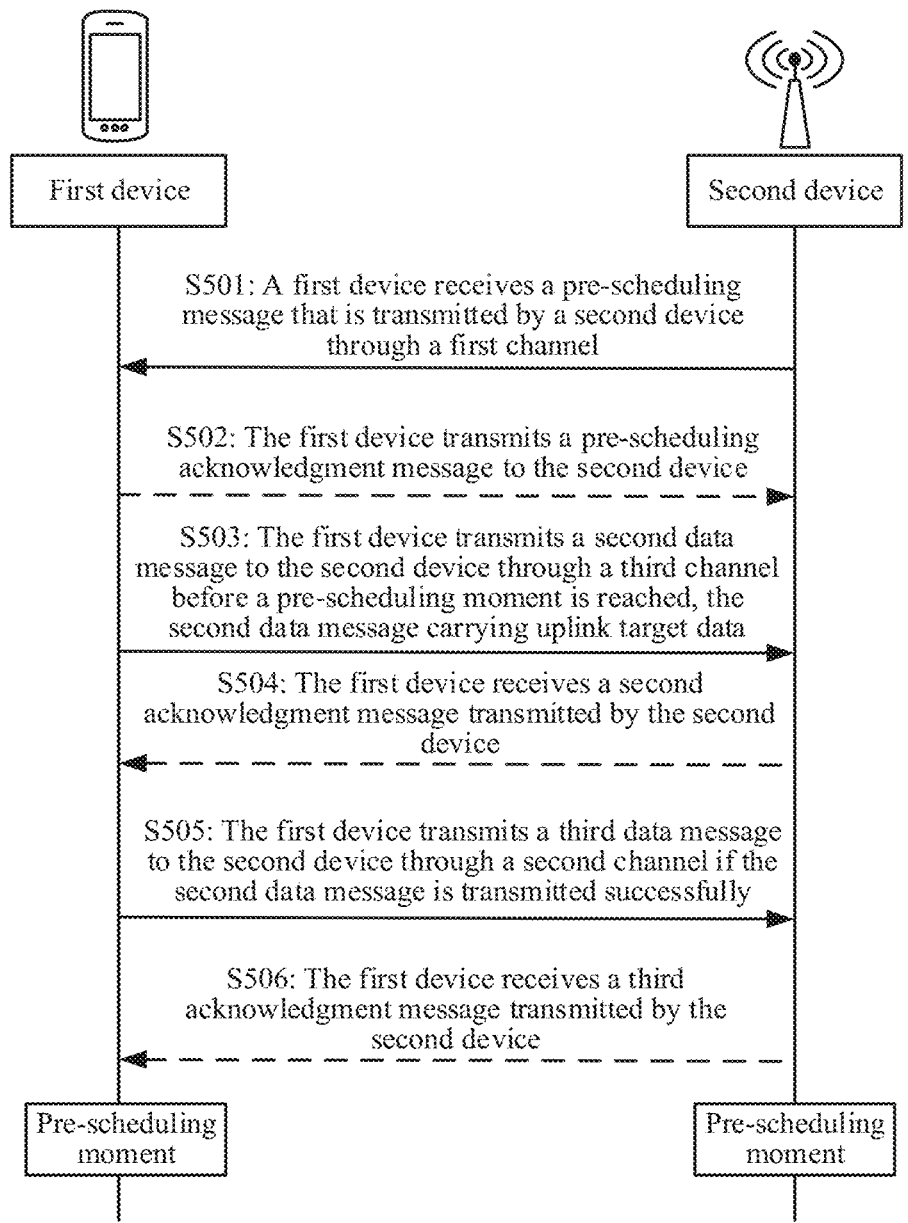
FIG. 5 is a schematic flowchart of a transmission processing method according to another embodiment of this application.

Based on the foregoing description, the embodiments of this application provide another transmission processing method. Referring to FIG. 5, the method is applied to the first device with consideration of uplink pre-scheduling transmission, and may include the following steps S501 to S506:

S501: The first device receives a pre-scheduling message that is transmitted by the second device through a first channel.

In some embodiments, the first device may further perform step S502 after step S501: the first device transmits a pre-scheduling acknowledgment message to the second device.

S503: The first device transmits a second data message to the second device through a third channel before the pre-scheduling moment is reached, the second data message carrying uplink target data.

A band used in the third channel is any band other than the pre-scheduling band. Then a possible and specific implementation process is that the first device transmits the second data message to the second device by using any band other than the pre-scheduling band before the pre-scheduling moment is reached. The second data message carries a data frame. The data frame carries the uplink target data of the first device.

The any band other than the pre-scheduling band refers to a band allowed by a network standard, for example, 2.4

GHz/5 GHz/6 GHz allowed by a WLAN standard. If the pre-scheduling moment is 8:20:15:100:200, and the pre-scheduling band is 6 GHz, the second data message may be transmitted at 8:20:5:00:00 by using 2.4 GHz or 5 GHz.

In some embodiments, the first device may further perform step S504 after step S503: the first device receives a second acknowledgment message transmitted by the second device.

After transmitting the second data message to the second device, if the first device receives the second acknowledgment message transmitted by the second device, the first device may consider that the uplink target data has been transmitted successfully to the second device. Then there is no need to repeatedly transmit the uplink target data at the pre-scheduling moment. Therefore, the first device may perform step S505 to cancel the pre-scheduling transmission.

If the first device has not received the second acknowledgment message returned by the second device, the first device considers that the uplink target data is not successfully transmitted to the second device. Then the first device may wait until the pre-scheduling moment is reached to transmit the uplink target data to the second device by using the pre-scheduling band, and end the procedure after the uplink target data is transmitted.

The quantity of times of transmitting the second data message by the first device through the third channel to the second device is not limited in this embodiment of this application. That is, before the pre-scheduling moment is reached, the first device may transmit the second data message repeatedly to the second device through the third channel. Besides, each time the first device transmits the second data message to the second device, the band used in the third channel may be the same, different, or partially the same.

S505: The first device transmits a third data message to the second device through a second channel if the second data message is transmitted successfully.

A band used in the second channel is also any band other than the pre-scheduling band. The band used in the first channel may be the same as, different from, or partially the same as the band used in the second channel; and the band used in the second channel may be the same as, different from, or partially the same as the band used in the third channel, which is not limited. The third data message carries indication information, used for indicating that the second device cancels the pre-scheduling transmission. The indication information may be represented by at least one bit in the third data message. The third data message includes any one of the following: a data frame, a control frame, or a management frame.

Referring to FIG. 6A for the structure of the control frame. The control frame includes: a protocol version field, used for indicating a protocol of the frame; a type field and a subtype field which are used for indicating a type of the frame, both the type field and the subtype field being located in a frame control (FC) field; a To DS field, used for indicating that the frame is a frame transmitted from a basic service set (BSS) to a destination server (DS); a From DS field, used for indicating that the frame is a frame transmitted from the DS to the BSS; a more frag field, used for illustrating whether there is another frame when a long frame is fragmented; a retry field, used for retransmission of a frame; a power management field, used for indicating whether a STA is in a power-saving mode or a non-power-saving mode; a more data field, used for indicating whether there is another data frame to be transmitted to a receiver; a protected frame field, used for indicating whether the frame body is encrypted; and an order field, used for indicating whether a strict numbering manner is used in transmission of a long frame segmented.

Correspondingly, if the third data message includes a control frame, the indication information may be located in the subtype field of the control frame. Specifically, the indication information is located in the subtype field of the FC field of the control frame, as shown in FIG. 6B. Alternatively, the indication information may be located in a control frame extension field of the control frame. The control frame extension field is located in the subtype field. Alternatively, the indication information may be further located in an idle bit of another field of the control frame, the another field being a field in the control frame other than the subtype field and the control frame extension field. For example, if the more frag field includes an idle bit, the indication information may be located in the idle bit of the more frag field, as shown in FIG. 6C.

Referring to FIG. 7 for the structure of the management frame. The management frame includes: a type field, a duration field, a receiver address (address 1) field, a transmitter address (address 2) field, a receiver address (address 3) field, a sequence control field, an HT control field, a frame body field, and a frame check sequence (FCS) field.

Correspondingly, if the third data message includes a management frame, the indication information may be located in the frame body field of the management frame. The frame body field may include a category field and a pre-scheduling transmission indication field. The category field is used for indicating that the management frame is used for canceling pre-scheduling transmission. The pre-scheduling transmission indication field is used for indicating cancellation of specified pre-scheduling transmission.

Specifically, a bit in the category field may be used to indicate cancellation of pre-scheduling transmission. For example, "1" is used to indicate cancellation of pre-scheduling transmission. One or more bits in the pre-scheduling transmission indication field are used to indicate cancellation of specified pre-scheduling transmission. Therefore, it can be seen that, if information about the category field is read as "1", it indicates that the pre-scheduling transmission needs to be canceled. In this case, information in the pre-scheduling transmission indication field may be read afterward to confirm the cancellation of the specified pre-scheduling transmission. If information about the category field is read as "0", there is no need to read the information in the pre-scheduling transmission indication field then.

If the third data message includes a data frame, the indication information is located in a MAC header or a physical header of the data frame.

In some embodiments, the first device may further perform step S506 after step S505: the first device receives a third acknowledgment message transmitted by the second device.

In a specific implementation process, after receiving the third data message transmitted by the first device, the second device transmits the third acknowledgment message to the first device. The third acknowledgment message is used by the second device to confirm to the first device that the third data message has been received successfully, and the pre-scheduling transmission has been canceled. Therefore, after receiving the third acknowledgment message, the first device cancels the pre-scheduling transmission. In some embodiments, the moment of performing step S506 may be earlier than the pre-scheduling moment.

The transmission processing method provided in this embodiment of this application is applicable to some services which are relatively sensitive to the delay, such as a MOBA service. An example in which the transmission processing method is applied to the MOBA is used: the second device (AP) pre-schedules the first device (STA) through the first channel to transmit game uplink data at the pre-scheduling moment. For example, the AP transmits the pre-scheduling message through the first channel (2.4 GHz band), so that the STA transmits the game uplink data by using 6 GHz band at the pre-scheduling moment (for example, a moment after 40 ms). The STA may transmit the pre-scheduling acknowledgment message to the AP to confirm to the AP that the pre-scheduling message is received. Then, the STA transmits the game uplink data to the AP by using a band other than 6 GHz band, before the pre-scheduling moment is reached. If the STA receives an acknowledgment message that is about the game uplink data and that is transmitted by the AP, the STA transmits a message carrying the indication information to the AP to inform the AP of cancellation of the pre-scheduling transmission, and cancels the pre-scheduling transmission after receiving an acknowledgment message that is about the message and that is fed back by the AP.

In this embodiment of this application, when the first device transmits data to the second device, the pre-scheduling moment may be determined according to the time domain information. By transmitting the uplink target data and the indication information before the pre-scheduling moment is reached, signal interference from other devices in data transmission performed at the pre-scheduling moment may be avoided to some extent, thereby improving the data transmission success rate, and reducing the transmission delay. Besides, because the uplink target data is transmitted before the pre-scheduling moment, using the indication information to indicate cancellation of pre-scheduling transmission can avoid waste of resources of the pre-scheduling transmission.

Figure 8:
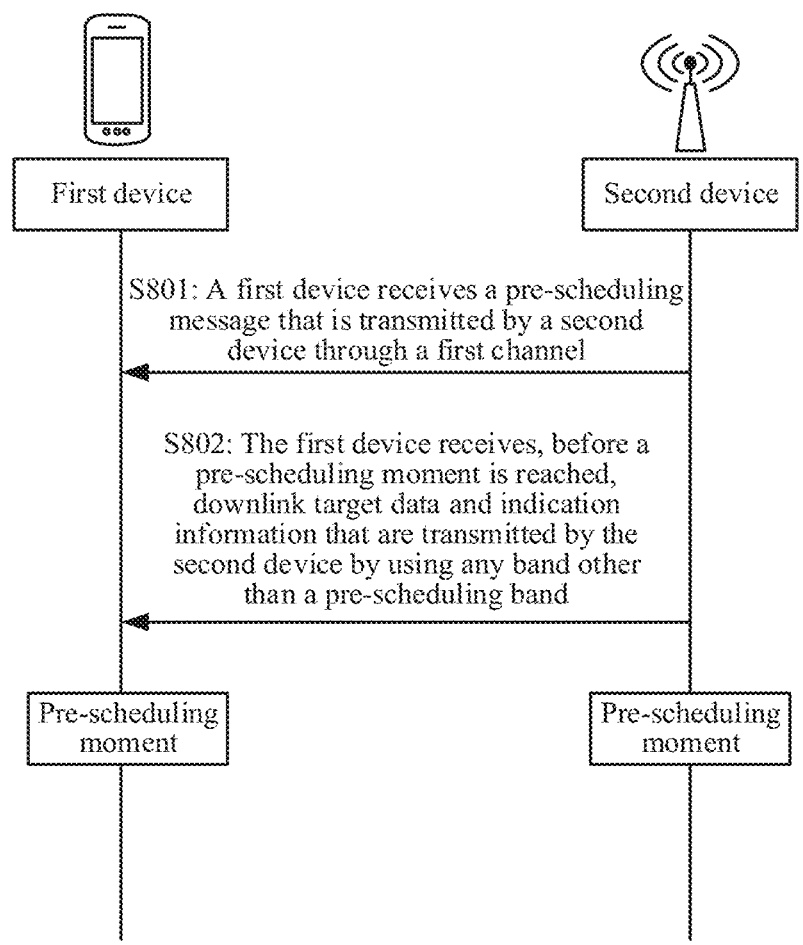
FIG. 8 is a schematic flowchart of a transmission processing method according to another embodiment of this application.

Based on the foregoing description, the embodiments of this application provide another transmission processing method. Referring to FIG. 8, the method is applied to the first device with consideration of downlink pre-scheduling transmission, and may include the following steps S801 and S802:

S801: The first device receives a pre-scheduling message that is transmitted by the second device through a first channel.

The second device transmits the pre-scheduling message to the first device through the first channel. The first device receives the pre-scheduling message that is transmitted by the second device through the first channel. The pre-scheduling message carries a pre-scheduling moment and a pre-scheduling band that are used for pre-scheduling transmission between the first device and the second device.

S802: The first device receives, before the pre-scheduling moment is reached, downlink target data and indication information that are transmitted by the second device by using any band other than the pre-scheduling band.

When the first device receives data from the second device by using the pre-scheduling band at the pre-scheduling moment which is reached, there may be signal interference from other devices using the same band, resulting in a failure of data reception. That is, the first device cannot successfully receive the downlink target data from the second device at the pre-scheduling moment.

Many services such as a MOBA service have relatively high delay requirements. If at the pre-scheduling moment, the first device has not successfully received the downlink target data, the service may be affected adversely, such as causing a frozen or a delayed interface. Therefore, to avoid the impacts on the service caused by unsuccessful reception of the downlink target data of the pre-scheduling transmission at the pre-scheduling moment, in the step, before the pre-scheduling moment is reached, the second device may transmit the downlink target data and the indication information to the first device. Correspondingly, the first device may receive, before the pre-scheduling moment is reached, the downlink target data and the indication information that are transmitted by the second device.

Specifically, step S802 may include the following two implementations:

In an implementation, the first device receives, before the pre-scheduling moment is reached, the downlink target data and the indication information that are transmitted simultaneously by the second device. In this implementation, step S802 may include the following step: the first device receives, before the pre-scheduling moment is reached, a fourth data message that is transmitted by the second device through a second channel. A band used in the second channel is any band other than the pre-scheduling band. The fourth data message carries the downlink target data and the indication information. A band used in the first channel may be the same as, different from, or partially the same as the band used in the second channel, which is not limited.

In the other implementation, before the pre-scheduling moment is reached, the first device receives the downlink target data and the indication information that are transmitted individually by the second device. In this implementation, step S802 may further include the following implementations: the first device receives, before the pre-scheduling moment is reached, a fifth data message that is transmitted by the second device through a third channel, any band other than the pre-scheduling band being used in the third channel, and the fifth data message carrying the downlink target data; and the first device receives a sixth data message that is transmitted by the second device through a second channel if the fifth data message is received successfully, the sixth data message carrying the indication information, and any band other than the pre-scheduling band being used in the second channel.

If the second device has not received, in preset duration, an acknowledgment message returned by the first device, the first device receives the downlink target data in step S802 from the second device by using the pre-scheduling band when the pre-scheduling moment is reached. The acknowledgment message refers to an acknowledgment message transmitted by the first device after correctly receiving the downlink target data.

In this embodiment of this application, when the first device receives the downlink target data from the second device, the pre-scheduling moment may be determined according to time domain information. By receiving the downlink target data and the indication information before the pre-scheduling moment is reached, signal interference from other devices in downlink data transmission performed at the pre-scheduling moment may be avoided to some extent, thereby improving the success rate of downlink data reception, and reducing the transmission delay. Besides, because the downlink target data is received before the pre-scheduling moment, using the indication information to indicate cancellation of pre-scheduling transmission can avoid waste of resources of the pre-scheduling transmission.

Figure 9:
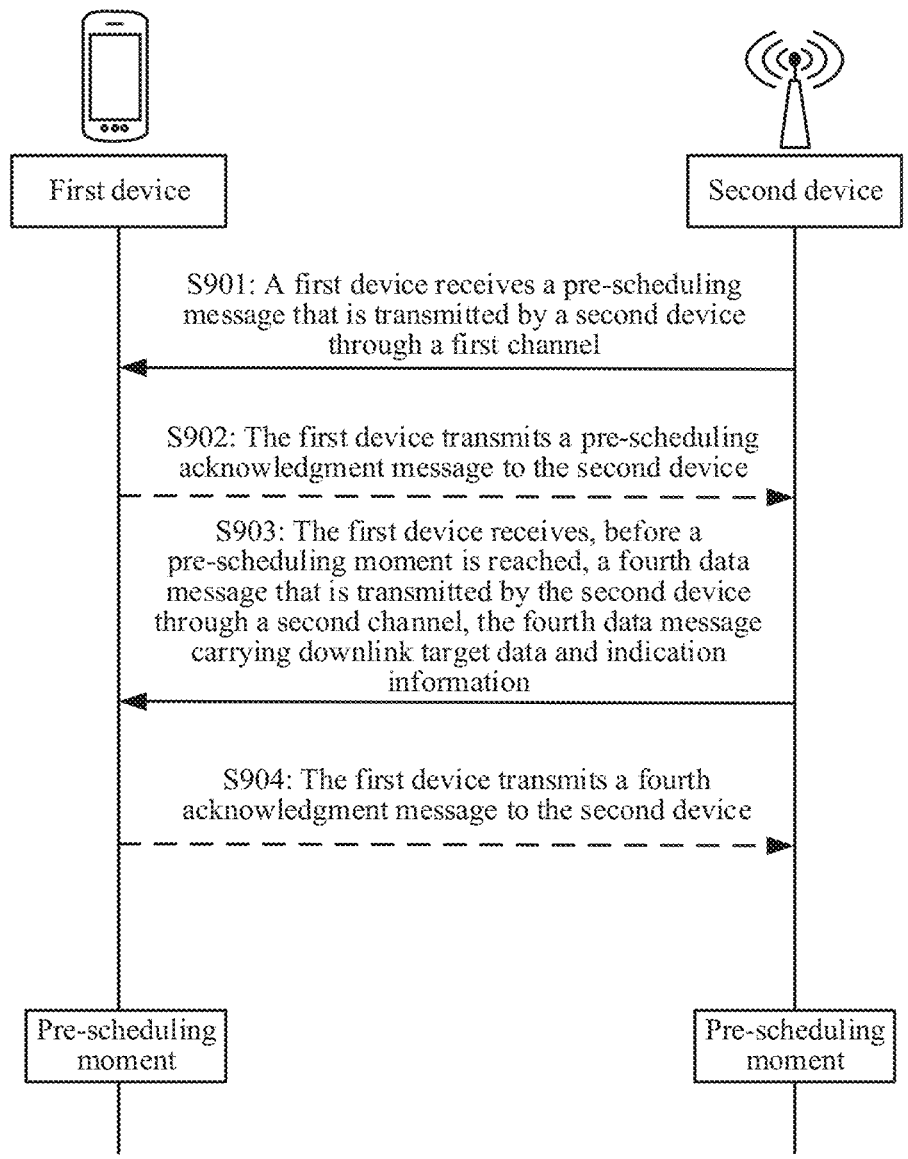
FIG. 9 is a schematic flowchart of a transmission processing method according to another embodiment of this application.

Based on the foregoing description, the embodiments of this application provide another transmission processing method. In this embodiment, the downlink pre-scheduling transmission is considered. Referring to FIG. 9, the method is applied to the first device and may include the following steps S901 to S904:

S901: The first device receives a pre-scheduling message that is transmitted by the second device through a first channel.

In some embodiments, the first device may further perform step S902 after step S901: the first device transmits a pre-scheduling acknowledgment message to the second device.

S903: The first device receives, before a pre-scheduling moment is reached, a fourth data message that is transmitted by the second device through a second channel, the fourth data message carrying downlink target data and indication information, and any band other than the pre-scheduling band being used in the second channel. The fourth data message includes a data frame. The indication information is located in a MAC header or a physical header of the data frame.

In some embodiments, after receiving the fourth data message that is transmitted by the second device through the second channel, the first device may further perform step S904: the first device transmits a fourth acknowledgment message to the second device.

If the second device receives the fourth acknowledgment message transmitted by the first device, the second device may consider that the fourth data message transmitted by the second device has successfully arrived at the first device and the first device has confirmed cancellation of the pre-scheduling transmission. In this case, the second device cancels the pre-scheduling transmission. If the second device has not received the fourth acknowledgment message returned by the first device, the second device may consider that the fourth data message has not successfully arrived at the first device. Then the second device may transmit, according to parameter information, the downlink target data by using the pre-scheduling band when the pre-scheduling moment is reached. Correspondingly, the first device may wait until the pre-scheduling moment is reached to receive the downlink target data from the second device by using the pre-scheduling band, and end the procedure after the downlink target data is received.

In this embodiment of this application, when the first device receives the downlink target data from the second device, the pre-scheduling moment may be determined according to time domain information. By receiving the downlink target data and the indication information before the pre-scheduling moment is reached, signal interference from other devices in data transmission performed at the pre-scheduling moment may be avoided to some extent, thereby improving the success rate of data reception, and reducing the transmission delay. Besides, because the downlink target data is received before the pre-scheduling moment, using the indication information to indicate cancellation of pre-scheduling transmission can avoid waste of resources of the pre-scheduling transmission.

Figure 10:
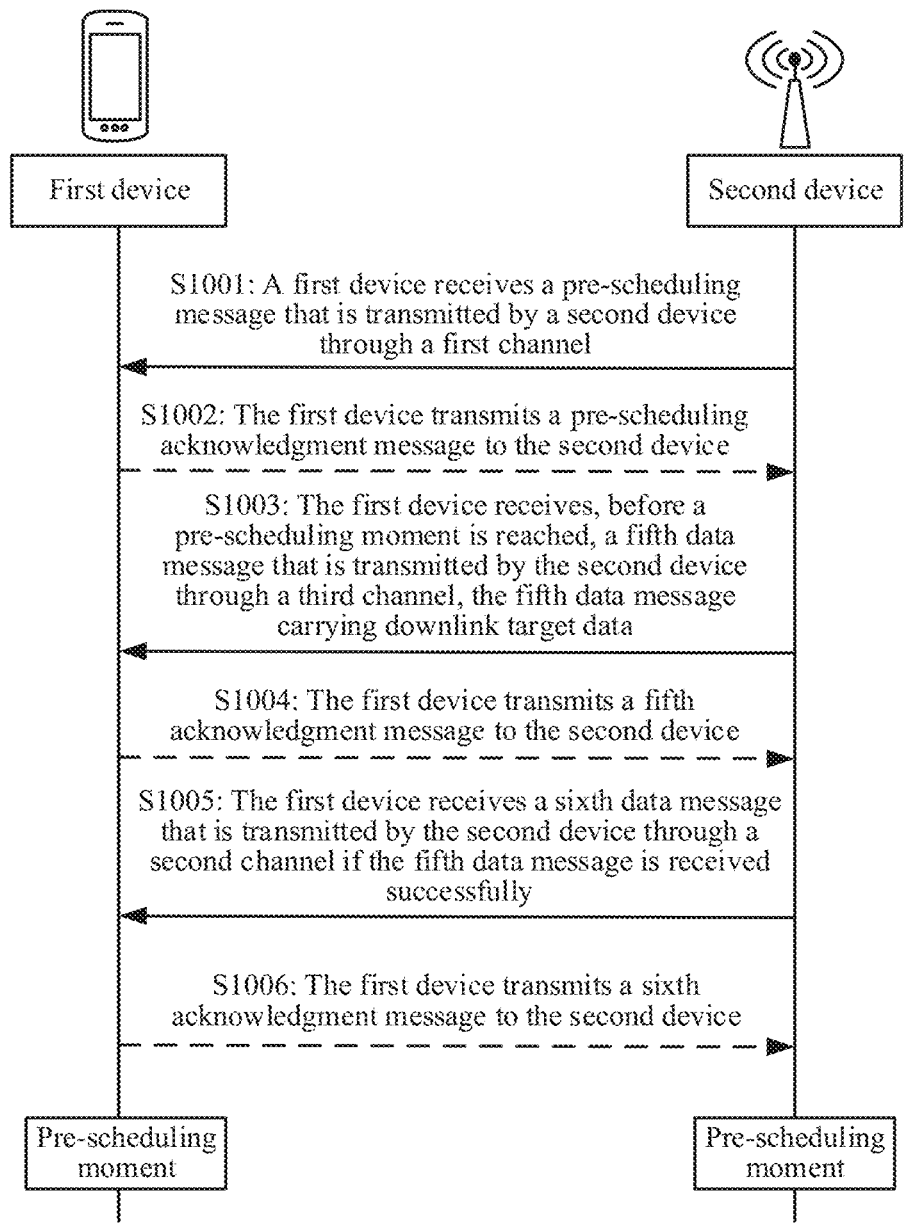
FIG. 10 is a schematic flowchart of a transmission processing method according to another embodiment of this application.

Based on the foregoing description, the embodiments of this application provide another transmission processing method. In this embodiment, the downlink pre-scheduling transmission is considered. Referring to FIG. 10, the method may include the following steps S1001 to S1006:

S1001: The first device receives a pre-scheduling message that is transmitted by the second device through a first channel.

In some embodiments, the first device may further perform step S1002 after step S1001: the first device transmits a pre-scheduling acknowledgment message to the second device.

S1003: The first device receives, before the pre-scheduling moment is reached, a fifth data message that is transmitted by the second device through a third channel.

A band used in the third channel is any band other than the pre-scheduling band. The fifth data message carries downlink target data. The fifth data message includes a data frame.

After receiving the fifth data message, the first device may perform step S1004: the first device transmits a fifth acknowledgment message to the second device.

Correspondingly, after transmitting the fifth data message to the first device, if the second device receives the fifth acknowledgment message transmitted by the first device, the second device may consider that the downlink target data has been successfully transmitted to the first device and then may transmit a sixth data message to the first device through a second channel, the sixth data message carrying indication information. In this case, the first device may perform step S1005. If the second device has not received the fifth acknowledgment message, the second device may consider that the downlink target data is not successfully transmitted to the first device. Then the second device may wait until the pre-scheduling moment is reached, to transmit the downlink target data to the first device by using the pre-scheduling band. Correspondingly, the first device may wait until the pre-scheduling moment is reached to receive the downlink target data from the second device by using the pre-scheduling band, and end the procedure after the downlink target data is received.

S1005: The first device receives the sixth data message that is transmitted by the second device through the second channel if the fifth data message is received successfully.

A band other than the pre-scheduling band is used in the second channel. The band used in the second channel may be the same as, different from, or partially the same as the band used in the third channel, which is not limited.

The sixth data message carries the indication information. The sixth data message includes any one of the following: a data frame, a control frame, or a management frame. If the sixth data message includes a control frame, the indication information is located in a subtype field of the control frame; or the indication information is located in a control frame extension field of the control frame; or the indication information is located in an idle bit of another field of the control frame, the another field being a field in the control frame other than the subtype field and the control frame extension field. If the sixth data message includes a data frame, the indication information is located in a MAC header or a physical header of the data frame. If the sixth data message includes a management frame, the indication information is located in a frame body field of the management frame. The frame body field includes a category field and a pre-scheduling transmission indication field.

In some embodiments, the first device may further perform step S1006 after step S1005: the first device transmits a sixth acknowledgment message to the second device.

In a specific implementation process, after receiving the sixth data message transmitted by the second device, the first device transmits the sixth acknowledgment message to the second device. After receiving the sixth acknowledgment message, the second device cancels the pre-scheduling transmission. In some embodiments, the moment of performing step S1006 may be earlier than the pre-scheduling moment.

The transmission processing method provided in this embodiment of this application is applicable to some services which are relatively sensitive to the delay, such as a MOBA service. An example in which the transmission processing method is applied to the MOBA is used: the second device (AP) pre-schedules the first device (STA) through the first channel to receive game downlink data at the pre-scheduling moment. For example, the AP transmits the pre-scheduling message through the first channel (2.4 GHz band), so that the STA receives the game downlink data by using the pre-scheduling band, namely, 6 GHz band at the pre-scheduling moment (for example, a moment after 40 ms). The STA may transmit the pre-scheduling acknowledgment message to the AP to confirm to the AP that the pre-scheduling message is received. Then, the AP transmits the game downlink data to the STA by using a band other than 6 GHz band, before the pre-scheduling moment is reached. If the AP receives an acknowledgment message that is about the game downlink data and that is transmitted by the STA, the AP transmits a message carrying the indication information to the STA to inform the STA of cancellation of the pre-scheduling transmission, and cancels the pre-scheduling transmission after receiving an acknowledgment message that is about the message and that is fed back by the STA.

In this embodiment of this application, when the first device receives the pre-scheduling message from the second device, the pre-scheduling moment may be determined according to time domain information. By receiving the downlink target data and the indication information before the pre-scheduling moment is reached, signal interference from other devices in downlink data transmission performed at the pre-scheduling moment may be avoided to some extent, thereby improving the success rate of data reception, and reducing the transmission delay. Besides, because the downlink target data is received before the pre-scheduling moment, using the indication information to indicate cancellation of pre-scheduling transmission can avoid waste of resources of the pre-scheduling transmission.

Figure 11:
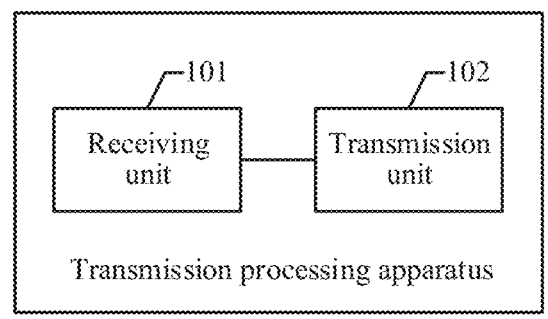
FIG. 11 is a schematic structural diagram of a transmission processing apparatus according to an embodiment of this application.

Based on the description of the foregoing method embodiments, the embodiments of this application further disclose a transmission processing apparatus. The transmission processing apparatus is applied to the first device. The transmission processing apparatus may be a computer program (including program code) run on the first device, or an entity apparatus included in the first device. The transmission processing apparatus can perform the methods shown in FIG. 2, FIG. 4, and FIG. 5. Referring to FIG. 11, the transmission processing apparatus can operate the following units:

a receiving unit 101, configured to receive a pre-scheduling message that is transmitted by a second device through a first channel, and read, from the pre-scheduling message, a pre-scheduling moment and a pre-scheduling band that are used for pre-scheduling transmission between the first device and the second device; and a transmission unit 102, configured to transmit, before the pre-scheduling moment is reached, uplink target data and indication information to the second device by using any band other than the pre-scheduling band, the indication information being used for indicating cancellation of the pre-scheduling transmission.

According to an embodiment of this application, the steps in the methods shown in FIG. 2, FIG. 4, and FIG. 5 may be performed by the units of the transmission processing apparatus shown in FIG. 11. For example, the steps S201 and S202 shown in FIG. 2 may be performed by the receiving unit 101 shown in FIG. 11, and the step S203 shown in FIG. 2 may be performed by the transmission unit 102 shown in FIG. 11. In another example, the steps S401 and S404 shown in FIG. 4 may be performed by the receiving unit 101 shown in FIG. 11, and the steps S402 and S403 may be performed by the transmission unit 102 shown in FIG. 11. In still another example, the steps S501, S504, and S506 shown in FIG. 5 may be performed by the receiving unit 101 shown in FIG. 11, and the steps S502, S503, and S505 may be performed by the transmission unit 102 shown in FIG. 11.

According to another embodiment of this application, units of the system for transmission processing apparatus shown in FIG. 11 may be separately or wholly combined into one or several other units, or one (or more) of the units herein may further be divided into multiple units of smaller functions. In this way, same operations can be implemented, and implementation of the technical effects of the embodiments of this application is not affected. The foregoing units are divided based on logical functions. In an actual application, a function of one unit may also be implemented by multiple units, or functions of multiple units are implemented by one unit. In another embodiment of this application, the transmission processing apparatus may also include other units. In an actual application, the functions may also be cooperatively implemented by other units and may be cooperatively implemented by a plurality of units.

According to another embodiment of this application, a computer program (including program code) that can perform the steps in the corresponding methods shown in FIG. 2, FIG. 4, and FIG. 5 may be run on a general computing device, such as a computer, which include processing elements and storage elements such as a central processing unit (CPU), a random access memory (RAM), and a read-only memory (ROM), to construct the transmission processing apparatus shown in FIG. 11, and implement the transmission processing method in the embodiments of this application. The computer program may be recorded in, for example, a computer readable recording medium, and may be loaded into the foregoing computing device by using the computer readable recording medium, and run on the computing device.

In this embodiment of this application, when the first device transmits data to the second device, the pre-scheduling moment may be determined according to the time domain information. By transmitting the target data and the indication information before the pre-scheduling moment is reached, signal interference from other devices in data transmission performed at the pre-scheduling moment may be avoided to some extent, thereby improving the data transmission success rate, and reducing the transmission delay. Besides, because the target data is transmitted before the pre-scheduling moment, using the indication information to indicate cancellation of pre-scheduling transmission can avoid waste of resources of the pre-scheduling transmission.

Figure 12:
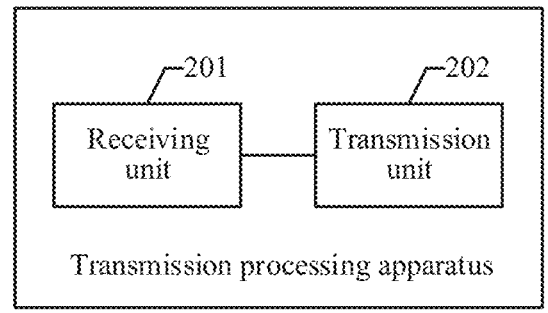
FIG. 12 is a schematic structural diagram of a transmission processing apparatus according to another embodiment of this application.

Based on the description of the foregoing method embodiments, the embodiments of this application further disclose a transmission processing apparatus. The transmission processing apparatus is applied to the first device. The transmission processing apparatus may be a computer program (including program code) run on the first device, or an entity apparatus included in the first device. The transmission processing apparatus can perform the methods shown in FIG. 8 to FIG. 10. Referring to FIG. 12, the transmission processing apparatus can operate the following units:

a receiving unit 201, configured to receive a pre-scheduling message that is transmitted by a second device through a first channel, the pre-scheduling message carrying a pre-scheduling moment and a pre-scheduling band that are used for pre-scheduling transmission between the first device and the second device, the receiving unit 201 being configured to receive, before the pre-scheduling moment is reached, downlink target data and indication information that are transmitted by the second device by using any band other than the pre-scheduling band, the indication information being used for indicating cancellation of the pre-scheduling transmission.

According to an embodiment of this application, the transmission processing apparatus may further include a transmission unit 202. The steps in the methods shown in FIG. 8 to FIG. 10 may be performed by the units of the transmission processing apparatus shown in FIG. 12. For example, the steps S801 and S802 shown in FIG. 8 may be performed by the receiving unit 201 shown in FIG. 12. In another example, the steps S901 and S903 shown in FIG. 9 may be performed by the receiving unit 201 shown in FIG. 12, and the steps S902 and S904 may be performed by the transmission unit 202 shown in FIG. 12. In still another example, the steps S1001, S1003, and S1005 shown in FIG. 10 may be performed by the receiving unit 201 shown in FIG. 12, and the steps S1002, S1004, and S1006 may be performed by the transmission unit 202 shown in FIG. 12.

Units of the system for transmission processing apparatus shown in FIG. 12 may be separately or wholly combined into one or several other units, or one (or more) of the units herein may further be divided into multiple units of smaller functions. In this way, same operations can be implemented, and implementation of the technical effects of the embodiments of this application is not affected. The foregoing units are divided based on logical functions. In an actual application, a function of one unit may also be implemented by multiple units, or functions of multiple units are implemented by one unit. In another embodiment of this application, the transmission processing apparatus may also include other units. In an actual application, the functions may also be cooperatively implemented by other units and may be cooperatively implemented by a plurality of units. In this application, the term "unit" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit can be implemented using one or more processors (or processors and memory). Likewise, a processor (or processors and memory) can be used to implement one or more units or sub-units.

According to another embodiment of this application, a computer program (including program code) that can perform the steps in the corresponding methods shown in FIG. 8 to FIG. 10 may be run on a general computing device, such as a computer, which include processing elements and storage elements such as a central processing unit (CPU), a random access memory (RAM), and a read-only memory (ROM), to construct the transmission processing apparatus shown in FIG. 12, and implement the transmission processing method in the embodiments of this application. The computer program may be recorded in, for example, a computer readable recording medium, and may be loaded into the foregoing computing device by using the computer readable recording medium, and run on the computing device.

In this embodiment of this application, when the first device receives the target data from the second device, the pre-scheduling moment may be determined according to time domain information. By receiving the target data and the indication information before the pre-scheduling moment is reached, signal interference from other devices in data transmission performed at the pre-scheduling moment may be avoided to some extent, thereby improving the success rate of data reception, and reducing the transmission delay. Besides, because the target data is received before the pre-scheduling moment, using the indication information to indicate cancellation of pre-scheduling transmission can avoid waste of resources of the pre-scheduling transmission.

Figure 13:
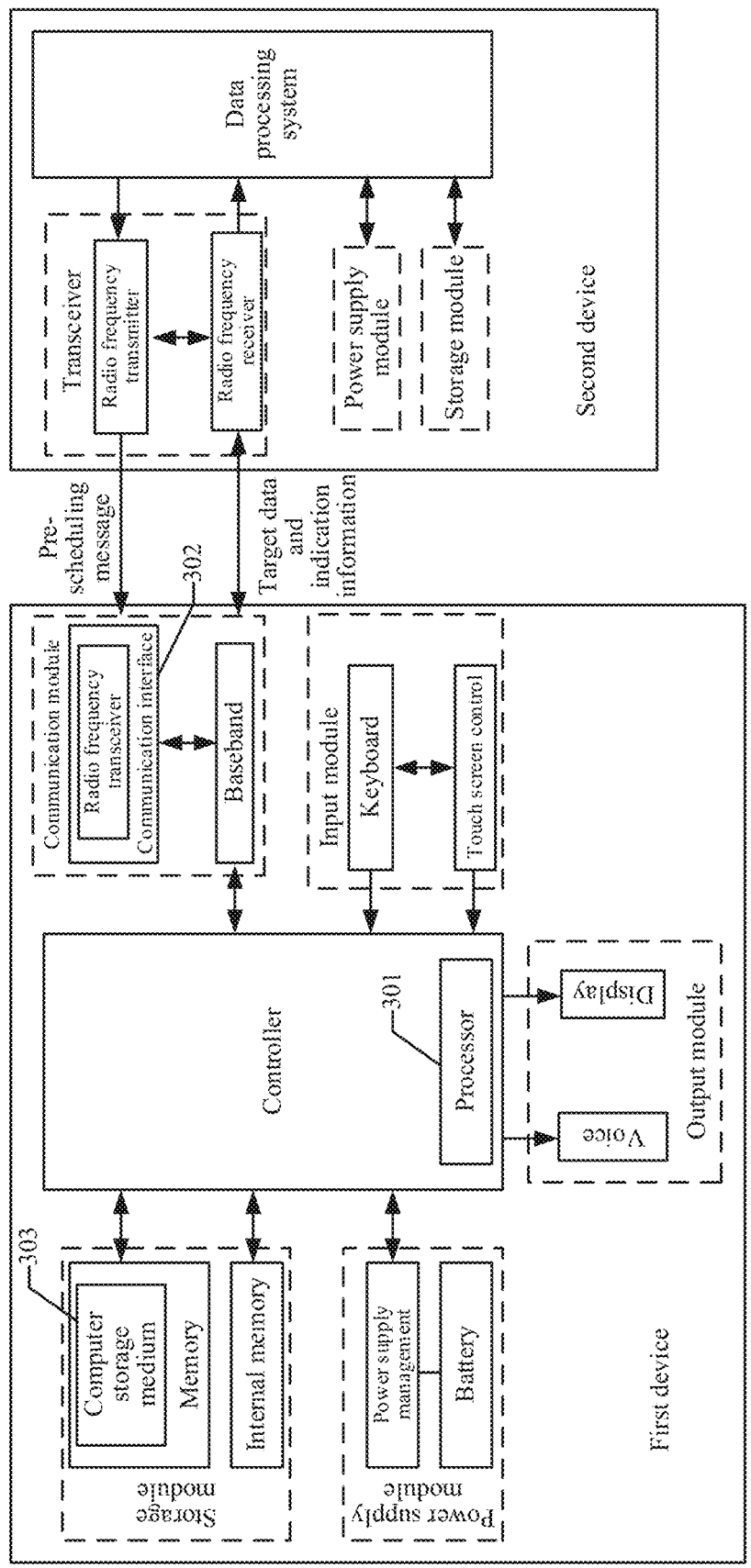
FIG. 13 is a schematic structural diagram of a device according to an embodiment of this application.

Based on the descriptions of the foregoing method embodiments and apparatus embodiments, the embodiments of this application further provide a device. The device may be the foregoing mentioned first device. The first device may be a terminal device, such as a STA. Referring to FIG. 13, the first device includes at least a processor 301, a communication interface 302, and a computer storage medium 303. The communication interface 302 may include a radio frequency transceiver, configured to transmit/receive data between the first device and another device (for example, the foregoing mentioned second device). In some embodiments, the first device may further include a power supply module, configured to supply power to the first device; an input module, configured to receive an input instruction of a user; and an output module, configured to output voice and display multimedia content such as an image and a video.

The computer storage medium 303 may be stored in a memory of the device. The computer storage medium 303 is configured to store a computer program. The computer program includes program instructions. The processor 301 is configured to execute the program instructions stored in the computer storage medium 303. The processor 301 (or referred to as a central processing unit (CPU)) is a computing core and a control core of the device, is suitable to implement one or more instructions, and is specifically suitable to load and execute one or more instructions to implement a corresponding method procedure or a corresponding function. In an embodiment, the processor 301 described in the embodiments of this application may be configured to perform a series of transmission processing, including: receiving a pre-scheduling message that is transmitted by a second device through a first channel; reading, from the pre-scheduling message, a pre-scheduling moment and a pre-scheduling band that are used for pre-scheduling transmission between the first device and the second device; and transmitting, before the pre-scheduling moment is reached, uplink target data and indication information to the second device by using any band other than the pre-scheduling band, the indication information being used for indicating cancellation of pre-scheduling transmission, and so on.

In another embodiment, the processor 301 may be further configured to perform a series of other transmission processing, including: receiving, by the first device, a pre-scheduling message that is transmitted by a second device through a first channel, the pre-scheduling message carrying a pre-scheduling moment and a pre-scheduling band that are used for pre-scheduling transmission between the first device and the second device; and receiving, before the pre-scheduling moment is reached, downlink target data and indication information that are transmitted by the second device by using any band other than the pre-scheduling band, the indication information being used for indicating cancellation of pre-scheduling transmission, and so on.

The embodiments of this application further provide a computer storage medium, and the computer storage medium is a memory device in a device and is configured to store programs and data. It may be understood that the computer storage medium herein may include an internal storage medium of the device and certainly may also include an extended storage medium supported by the device. The computer storage medium provides storage space, and the storage space stores an operating system of the device. In addition, the storage space further stores one or more instructions suitable to be loaded and executed by the processor 301. The instructions may be one or more computer programs (including program code). The computer storage medium herein may be a high-speed RAM memory, or may be a non-volatile memory, such as at least one magnetic disk storage. In some embodiments, the computer storage medium may be at least one computer storage medium far away from the foregoing processor. In an embodiment, the processor 301 may load and execute one or more instructions stored in the computer storage medium, to implement corresponding steps of the methods in transmission processing embodiments shown in FIG. 2, FIG. 4, and FIG. 5. In another embodiment, the processor 301 may load and execute one or more instructions stored in the computer storage medium, to implement corresponding steps of the methods in transmission processing embodiments shown in FIG. 8 to FIG. 10.

The embodiments of this application further provide a device. The device may be the foregoing mentioned second device. The second device may be a network device, such as an AP or a base station. As shown in FIG. 13, the second device may include a transceiver and a data processing system. The transceiver may be configured to transmit/receive data between the second device and the first device. The transceiver may include a radio frequency receiver and a radio frequency transmitter. In some embodiments, the second device may further include a power supply module, configured to supply power to the second device; and a storage module, configured to store program code.

In an embodiment, aiming at uplink pre-scheduling transmission, a specific procedure of data transmission between the first device and the second device is as follows:

The second device transmits a pre-scheduling message to the first device through the first channel by using the radio frequency transmitter in the transceiver. Correspondingly, the first device receives, by using the radio frequency transceiver in the communication interface, the pre-scheduling message that is transmitted by the second device through the first channel. The processor 301 in the first device reads, from the pre-scheduling message, a pre-scheduling moment and a pre-scheduling band that are used for pre-scheduling transmission between the first device and the second device. In some embodiments, after receiving the pre-scheduling message, the first device may transmit a pre-scheduling acknowledgment message to the second device.

Before the pre-scheduling moment is reached, the first device transmits, by using the radio frequency transceiver in the communication interface, uplink target data and indication information to the second device by using any band other than the pre-scheduling band, the indication information being used for indicating cancellation of the pre-scheduling transmission. After receiving the target data and the indication information by using the radio frequency receiver in the transceiver, the second device may cancel the pre-scheduling transmission according to the indication information.

In an implementation, before the pre-scheduling moment is reached, the first device may transmit the uplink target data and the indication information simultaneously to the second device by using the radio frequency transceiver in the communication interface. Specifically, the first device transmits, before the pre-scheduling moment is reached, a first data message to the second device through a second channel by using the radio frequency transceiver in the communication interface, the first data message carrying the uplink target data and the indication information. In some embodiments, after receiving the first data message through the radio frequency receiver in the transceiver, the second device may transmit a first acknowledgment message to the first device by using the radio frequency transmitter in the transceiver. After receiving the first acknowledgment message, the first device cancels the pre-scheduling transmission.

In another embodiment, before the pre-scheduling moment is reached, the first device may transmit the uplink target data and the indication information individually to the second device by using the radio frequency transceiver in the communication interface. Specifically, the first device transmits, before the pre-scheduling moment is reached, a second data message to the second device through a third channel by using the radio frequency transceiver in the communication interface, the second data message carrying the uplink target data. In some embodiments, after receiving the second data message through the radio frequency receiver in the transceiver, the second device may transmit a second acknowledgment message to the first device by using the radio frequency transmitter in the transceiver. After receiving the second acknowledgment message, the first device may consider that the second data message is transmitted successfully. The first device may transmit a third data message to the second device through a second channel by using the radio frequency transceiver in the communication interface if the second data message is transmitted successfully, the third data message carrying the indication information. After receiving the third data message, the second device may cancel the pre-scheduling transmission according to the indication information. In some embodiments, after receiving the third data message through the radio frequency receiver in the transceiver, the second device may transmit a third acknowledgment message to the first device by using the radio frequency transmitter in the transceiver. After receiving the third acknowledgment message, the first device cancels the pre-scheduling transmission.

In this embodiment of this application, when the first device transmits data to the second device, the pre-scheduling moment may be determined according to the time domain information. By transmitting the uplink target data and the indication information before the pre-scheduling moment is reached, signal interference from other devices in uplink data transmission performed at the pre-scheduling moment may be avoided to some extent, thereby improving the data transmission success rate, and reducing the transmission delay. Besides, because the uplink target data is transmitted before the pre-scheduling moment, using the indication information to indicate cancellation of pre-scheduling transmission can avoid waste of resources of the pre-scheduling transmission.

In another embodiment, aiming at downlink pre-scheduling transmission, a specific procedure of data transmission between the first device and the second device is as follows:

The second device transmits a pre-scheduling message to the first device through the first channel by using the radio frequency transmitter in the transceiver. Correspondingly, the first device receives, by using the radio frequency transceiver in the communication interface, the pre-scheduling message that is transmitted by the second device through the first channel. The pre-scheduling message carries a pre-scheduling moment and a pre-scheduling band that are used for indicating pre-scheduling transmission between the first device and the second device. In some embodiments, after receiving the pre-scheduling message, the first device may transmit a pre-scheduling acknowledgment message to the second device.

Before the pre-scheduling moment is reached, the second device may transmit downlink target data and indication information that are used for pre-scheduling to the first device by using the radio frequency transmitter in the transceiver. Correspondingly, the first device receives the downlink target data and the indication information from the second device by using the radio frequency transceiver in the communication interface, and cancels the pre-scheduling transmission according to the indication information.

In an implementation, before the pre-scheduling moment is reached, the second device may transmit the downlink target data and the indication information simultaneously to the first device by using the radio frequency transmitter in the transceiver. Specifically, the second device transmits, before the pre-scheduling moment is reached, a fourth data message to the first device through a second channel by using the radio frequency transmitter in the transceiver, the fourth data message carrying the downlink target data and the indication information. Correspondingly, the first device receives the fourth data message from the second device by using the radio frequency transceiver in the communication interface, and cancels the pre-scheduling transmission according to the indication information. In some embodiments, after receiving the fourth data message, the first device may transmit a fourth acknowledgment message to the second device by using the radio frequency transceiver in the communication interface. After receiving the fourth acknowledgment message, the second device cancels the pre-scheduling transmission.

In another embodiment, before the pre-scheduling moment is reached, the second device may transmit the downlink target data and the indication information individually to the first device by using the radio frequency transmitter in the transceiver. Specifically, the second device may transmit, before the pre-scheduling moment is reached, a fifth data message to the first device through a third channel by using the radio frequency transmitter in the transceiver, the fifth data message carrying the downlink target data. In some embodiments, after receiving the fifth data message, the first device may transmit a fifth acknowledgment message to the second device by using the radio frequency transceiver in the communication interface. After receiving the fifth acknowledgment message, the second device may consider that the fifth data message is transmitted successfully. The second device may transmit a sixth data message to the first device through a second channel by using the radio frequency transmitter in the transceiver if the fifth data message is transmitted successfully, the sixth data message carrying the indication information. After receiving the sixth data message, the first device may cancel the pre-scheduling transmission according to the indication information. In some embodiments, after receiving the sixth data message, the first device may transmit a sixth acknowledgment message to the second device by using the radio frequency transceiver in the communication interface. After receiving the sixth acknowledgment message, the second device cancels the pre-scheduling transmission.

In this embodiment of this application, when the first device receives the downlink target data from the second device, the pre-scheduling moment may be determined according to time domain information. By receiving the downlink target data and the indication information before the pre-scheduling moment is reached, signal interference from other devices in downlink data transmission performed at the pre-scheduling moment may be avoided to some extent, thereby improving the success rate of data reception, and reducing the transmission delay. Besides, because the downlink target data is received before the pre-scheduling moment, using the indication information to indicate cancellation of pre-scheduling transmission can avoid waste of resources of the pre-scheduling transmission.

What is disclosed above is merely exemplary embodiments of this application, and certainly is not intended to limit the scope of the claims of this application. Therefore, equivalent variations made in accordance with the claims of this application shall fall within the scope of this application.

What is claimed is:

1. A transmission processing method performed by a first device, the method comprising:
   receiving a pre-scheduling message that is transmitted by a second device through a first channel;
   reading, from the pre-scheduling message, a pre-scheduling moment and a pre-scheduling band that are used for pre-scheduling transmission between the first device and the second device; and
   transmitting, before the pre-scheduling moment is reached, indication information to the second device by using any band other than the pre-scheduling band, the indication information being used for indicating cancellation of the pre-scheduling transmission.

2. The method according to claim 1, wherein the indication information comprises a target serial number or a target pre-scheduling moment; and
   the indication information is used for indicating cancellation of the pre-scheduling transmission corresponding to the target serial number, or indicating cancellation of the pre-scheduling transmission corresponding to the target pre-scheduling moment.

3. The method according to claim 2, wherein when there are a plurality of pre-scheduling transmissions between the first device and the second device, the indication information is used for indicating cancellation of target pre-scheduling transmission in the plurality of pre-scheduling transmissions, wherein
   the target pre-scheduling transmission is the pre-scheduling transmission corresponding to the target serial number; or
   the target pre-scheduling transmission is the pre-scheduling transmission corresponding to the target pre-scheduling moment; or
   the target pre-scheduling transmission is one of the plurality of pre-scheduling transmissions other than the pre-scheduling transmission corresponding to the target serial number; or
   the target pre-scheduling transmission is pre-scheduling transmission in the plurality of pre-scheduling transmissions other than the pre-scheduling transmission corresponding to the target pre-scheduling moment.

4. The method according to claim 3, wherein the indication information is represented by a preset number of bits.

5. The method according to claim 1, wherein the transmitting, before the pre-scheduling moment is reached, indication information to the second device by using any band other than the pre-scheduling band comprises:
   transmitting a first data message to the second device through a second channel, the first data message carrying the indication information and a band other than the pre-scheduling band being used in the second channel.

6. The method according to claim 5, wherein a band used in the first channel is different from the band used in the second channel.

7. The method according to claim 5, wherein the first data message comprises a data frame; and the indication information is located in a Media Access Control (MAC) header or a physical header of the data frame.

8. The method according to claim 1, wherein the transmitting, before the pre-scheduling moment is reached, indication information to the second device by using any band other than the pre-scheduling band comprises:
   transmitting a second data message to the second device through a third channel, the second data message carrying a band other than the pre-scheduling band being used in the third channel; and
   transmitting a third data message to the second device through a second channel when the second data message is transmitted successfully, the third data message carrying the indication information, and a band other than the pre-scheduling band being used in the second channel.

9. The method according to claim 8, wherein a band used in the first channel is the same as, different from, or partially the same as the band used in the second channel; and the band used in the second channel is the same as, different from, or partially the same as the band used in the third channel.

10. The method according to claim 8, wherein when the third data message comprises a control frame, the indication information is located in a subtype field of the control frame; or the indication information is located in a control frame extension field of the control frame; or the indication information is located in an idle bit of another field of the control frame, the another field being a field in the control frame other than the subtype field and the control frame extension field.

11. The method according to claim 8, wherein when the third data message comprises a data frame, the indication information is located in a MAC header or a physical header of the data frame.

12. The method according to claim 8, wherein when the third data message comprises a management frame, the indication information is located in a frame body field of the management frame, the frame body field comprising a category field and a pre-scheduling transmission indication field.

13. The method according to claim 1, wherein the pre-scheduling band is different from a band used in the first channel.

14. The method according to claim 1, further comprising:
   canceling the pre-scheduling transmission when a first acknowledgment message is received from the second device; and
   transmitting the uplink target data by using the pre-scheduling band when the pre-scheduling moment is reached, when the first acknowledgment message is not received from the second device.

15. A first device, comprising:
   a processor; and
   a computer storage medium, storing one or more instructions, the one or more instructions, when executed by the processor, cause the first device to perform a plurality of operations including:
      receiving a pre-scheduling message that is transmitted by a second device through a first channel;
      reading, from the pre-scheduling message, a pre-scheduling moment and a pre-scheduling band that are used for pre-scheduling transmission between the first device and the second device; and
      transmitting, before the pre-scheduling moment is reached, indication information to the second device by using any band other than the pre-scheduling band, the indication information being used for indicating cancellation of the pre-scheduling transmission.

16. The device according to claim 15, wherein the indication information comprises a target serial number or a target pre-scheduling moment; and
   the indication information is used for indicating cancellation of the pre-scheduling transmission corresponding to the target serial number, or indicating cancellation of the pre-scheduling transmission corresponding to the target pre-scheduling moment.

17. The device according to claim 15, wherein the transmitting, before the pre-scheduling moment is reached, indication information to the second device by using any band other than the pre-scheduling band comprises:
   transmitting a first data message to the second device through a second channel before the pre-scheduling moment is reached, the first data message carrying the indication information, wherein a band other than the pre-scheduling band is used in the second channel.

18. The device according to claim 15, wherein the pre-scheduling band is different from a band used in the first channel.

19. The device according to claim 15, wherein the plurality of operations further comprise:
   canceling the pre-scheduling transmission when a first acknowledgment message is received from the second device; and
   transmitting the uplink target data by using the pre-scheduling band when the pre-scheduling moment is reached, when the first acknowledgment message is not received from the second device.

20. A non-transitory computer storage medium, storing one or more instructions, the one or more instructions, when executed by a processor of a first device, cause the first device to perform a plurality of operations including:
   receiving a pre-scheduling message that is transmitted by a second device through a first channel;
   reading, from the pre-scheduling message, a pre-scheduling moment and a pre-scheduling band that are used for pre-scheduling transmission between the first device and the second device; and
   transmitting, before the pre-scheduling moment is reached, indication information to the second device by using any band other than the pre-scheduling band, the indication information being used for indicating cancellation of the pre-scheduling transmission.

* * * * *